United States Patent [19]

Deckers

[11] Patent Number: 4,763,624
[45] Date of Patent: Aug. 16, 1988

[54] COMBUSTION ENGINE

[75] Inventor: Roger J. H. Deckers, Someren, Netherlands

[73] Assignee: Volvo Car B.V., Helmond, Netherlands

[21] Appl. No.: 59,900

[22] Filed: Jun. 9, 1987

[30] Foreign Application Priority Data

Jun. 9, 1986 [NL] Netherlands .................. 8601487

[51] Int. Cl.$^4$ ............................................. F02B 15/00
[52] U.S. Cl. ................................... 123/432; 123/308
[58] Field of Search ............................ 123/432, 308

[56] References Cited

U.S. PATENT DOCUMENTS

| | | | |
|---|---|---|---|
| 4,232,640 | 11/1980 | Matsumoto et al. | 123/308 |
| 4,271,795 | 6/1981 | Nakagawa et al. | 123/308 |
| 4,304,211 | 12/1981 | Tezuka et al. | 123/432 |
| 4,313,410 | 2/1982 | Kunii et al. | 123/432 |
| 4,450,803 | 5/1984 | Namba et al. | 123/308 |
| 4,491,104 | 1/1985 | Fujii et al. | 123/432 |
| 4,522,173 | 6/1985 | Agache | 123/276 |
| 4,543,929 | 10/1985 | Kataoka et al. | 123/263 |
| 4,553,514 | 11/1985 | Namba et al. | 123/308 |

FOREIGN PATENT DOCUMENTS

| | | |
|---|---|---|
| 0108014 | 5/1984 | European Pat. Off. . |
| 2854692 | 6/1979 | Fed. Rep. of Germany . |
| 2950754 | 9/1980 | Fed. Rep. of Germany . |
| 3131066 | 5/1982 | Fed. Rep. of Germany . |
| 1449256 | 7/1966 | France . |
| 2409386 | 6/1979 | France . |

OTHER PUBLICATIONS

Patent Abstract of Japan, vol. 6, No. 249, Kamo, 146016, 12/1982.

*Primary Examiner*—E. Rollins Cross
*Attorney, Agent, or Firm*—Pennie & Edmonds

[57] ABSTRACT

Four-stroke combustion engine comprising a cylinder block having a cylinder in which a piston can move, a cylinder head with an intake manifold whose intake opening forms part of the cylinder head, said opening being opened or closed by an intake valve and with a by-pass which is separated from the main inlet channel and has a discharge opening direct into said inlet channel, upstream of the valve, whereby besides the by-pass (2) for air in the main inlet channel (6) also an injector (1) opens into this intake manifold (6) in such a place and such a position that the center line of the fuel jet is directed at the foot of the inlet valve (5).

1 Claim, 2 Drawing Sheets

COMBUSTION ENGINE

The invention relates to a four-stroke combustion engine (Otto-motor), substantially consisting of one or more of the following parts:

a cylinder block having at least one cylinder in which a piston can move, a cylinder head with a main inlet channel (intake manifold) whose intake opening forms part of the cylinder head, said opening being opened or closed by means of an intake valve, so that gas can flow into the combustion chamber between the piston and the cylinder head with a parallel inlet channel (by-pass) which is at least substantially separated from the main inlet channel and has a discharge opening direct into said inlet channel, upstream of the valve, whereby the direction of flow of gas flowing out along the valve stem is directed at the ignition point of a spark plug which is mounted in the cylinder head.

The above state of the art is known from No. DE-OS-3131066.

Furthermore constructions are known whereby the piston practically touches the cylinder head during the piston strokes. This effects a very good removal of residual gases from the cylinder and mixing in the combustion space during the compression stroke (squish-flow). The combustion chamber, also space for the valve (valves respectively) and the spark plug is then formed by a - usually eccentric cavity in the piston head. Such a construction is e.g. found in EP No. 108,014 or DT No. 2950,754.

The construction with separate inlet channel (by-pass) mentioned in the preamble has for its purpose an improvement of the fuel consumption and a reduction of the emission of noxious fumes, said reduction being effected as a result of a strong swirling action due to the action of the parallel inlet channel. This applies all the more in those cases whereby the construction is such that residual gases are exhausted very well, or are forced, by squish-action at the end of the compression stroke, to the combustion chamber in the manner described above. Residual gases are cleared out well near the spark plug and there is a "squish-zone" which brings the combustible mixture in good condition near the spark plug and into the combustion space in the cylinder.

The above has so far applied to combustion engines, whereby a combustible mixture (of air and fuel), obtained by means of a carburettor, is sucked in.

The present invention makes it possible to use the above advantages also in injection engines, whereby air is sucked in during the intake stroke of the piston and fuel is injected at the right moment. This is possible by having:

1. a combustion chamber with a large squish surface;
2. a central spark plug position relative to supplied air and fuel;
3. a primary turbulence system;
4. a time oriented fuel injection.

According to the invention these conditions can be met when besides the parallel inlet channel (by-pass) for air in the main inlet channel the injection point (injector) for fuel also opens into this intake manifold in such a place and position that the centre line of the fuel jet is directed at the valve foot, whilst in a known manner the upper side (head) of the piston in its upper dead centre practically touches the upper side of the cylinder and the combustion of a gas mixture takes place in a cavity in the piston head. Said combustion chamber is usually placed eccentrically relative to the centre line of the piston, dependent on the location of the inlet valve and spark plug, but may also be located centrally.

The parallel channel (the by-pass) can be located at least partly inside the intake manifold, or open into the manifold via a bore, in the right place and position of course.

Valve position and ignition timing are usually determined by the piston position; the quantity of injected fuel and the quantity of air supplied through the intake manifold and/or by-pass are dependent on the power to be supplied. External regulating means are required for this.

Because of the combination of characteristics according to the invention and especially because of the eccentric combustion chamber and the controlled by-pass air channel it will be possible to meet the future European emission requirements (ECE R15-05) for medium-sized vehicles of approximately 84 to 120 cubic inches displacement, while the consumption of fuel, contrary to expectations, is much better (app. 15% better for the Europe-mix conditions) in comparison with present standard engine concepts or concepts which apply only one of the characteristics mentioned.

This improvement in consumption is remarkable and significant, as an improved emission is normally achieved at the cost of a higher consumption. Meeting said emission requirements and especially the nitrous oxide component (NOx) is based on the physical phenomenon of the improved ignition of lean mixtures by: generating turbulence in the cylinder, which is maintained until the end of the compression stroke and clearing out residual gases in the regions of the ignition source.

By applying the combination of characteristics according to the invention the shifting of the so-called lean misfire limit (LML) to higher air/fuel ratios for the purpose of the required NOx-decrease can be realised not only in the low partial load area (Europe cycle), but also with higher outputs (higher speeds i.e. motorway traffic), which will be necessary for the additional European emission requirements.

At the same time, due to the combination of characteristics according to the invention, an increased EGR-admissibility is possible whereby, when using a controlled three-way catalyst (TWC), the very strict US emission limits can be met, while retaining a considerably better fuel consumption. The designation "EGR" stands for "Exhaust Gas Recirculation": part of the exhaust gases are resupplied to the engine. The exhaust gases influence combustion by decreasing the combustion temperature. As a result of this content of nitrogen dioxide in the exhaust gases is decreased.

The invention will be explained with reference to a drawing. In the drawing.

Figure 1:
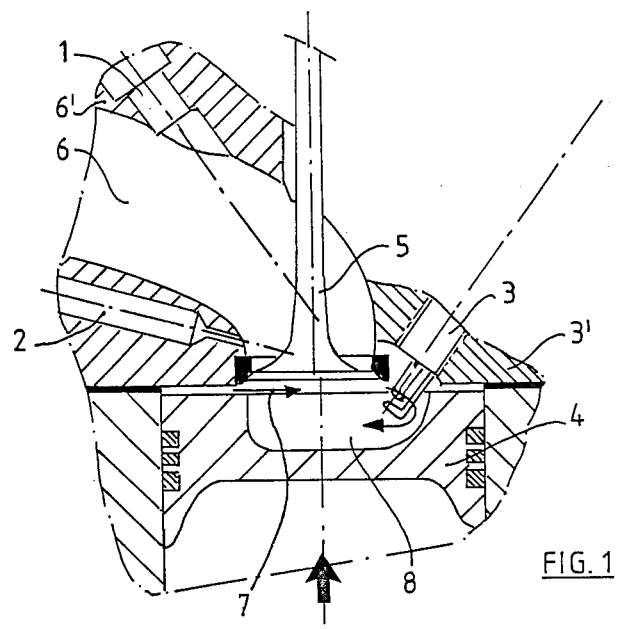
FIG. 1 is a cross-section of a cylinder head with the piston in the uppermost position (compression stroke)
Figure 2:
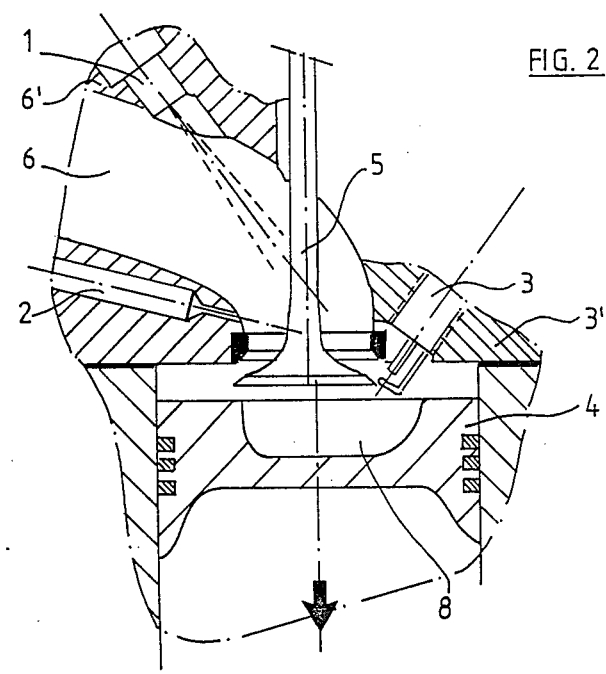
FIG. 2 is the same cross-section during the suction stroke.

FIG. 1 shows a cross-section of a cylinder head with the piston in the uppermost position, the compression position. The injector 1 for the fuel injection is located in the wall 6' of the intake air channel (intake manifold) 6, such that the centre line of the fuel to be injected is directed at the head of intake valves. One by-pass air channel is present as a bore 2, opening into the intake manifold 6. Its centre line is directed at the ignition point of the spark plug 3 along the valve stem and valve head of inlet valve 5. The fuel injector 1, the by-pass channel 2 and the spark plug 3, which is mounted in the cylinder head 3', are located relative to one another in such a manner, therefore, that the centre line of the fuel jet is directed at the valve head and that the air jet does not touch the stem of the inlet valve 5 when the latter is open, as is indicated in FIG. 2 (suction stroke). This figure has reference numbers with the same meaning as those of FIG. 1. As FIGS. 1 and 2 show, the combustion chamber 8 is located somewhat eccentrically relative to the centre line of piston 4. Arrow 7 of FIG. 1 indicates the squish flow of the gas mixture in the direction of the combustion chamber 8 and spark plug 3.

Figure 3:
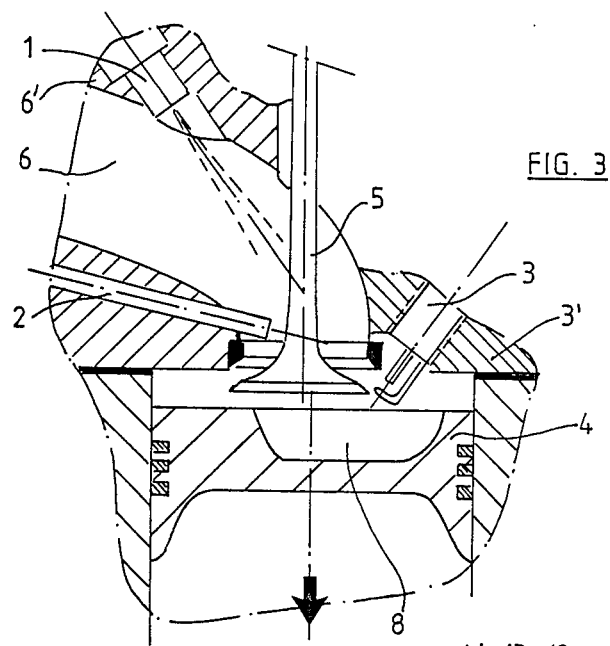
FIG. 3 depicts another embodiment of the cylinder head.

FIG. 3 shows, with the same reference numbers, an embodiment whereby the by-pass channel 2' is partly located inside the air-supply channel (intake manifold) 6.

Figure 4:
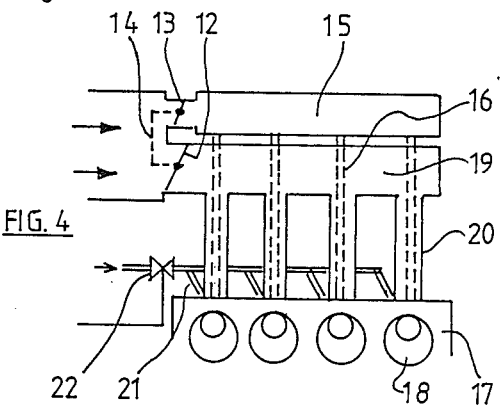
FIG. 4 is a schematic drawing of the external supply and regulating means.

FIG. 4 diagrammatically illustrates a possible external supply and regulating system for a combustion engine having 4 cylinders in an engine block 17. Via an air filter air is supplied, regulated by a main throttle valve 12 and a by-pass throttle valve 13, which are operated by a control 14, dependent on the power to be supplied. Both supplies have a damping chamber, 19 and 15 respectively. From the damping chambers 19 and 15 main inlet channels 20 and parallel inlet channels 16 lead respectively to the cylinders/combustion chambers 18. Via a fuel pressure regulator 22 fuel is injected, via fuel injectors 21, into the combustion chambers 18 at the desired moment.

Figure 5:
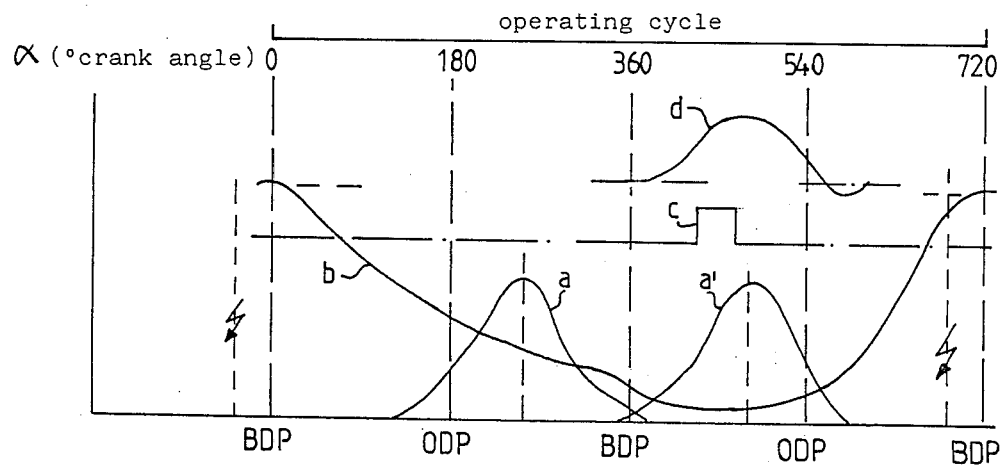
FIG. 5 is a graphic representation illustrating the operating cycle as a function of the crank angle for a four-stroke Otto engine according to the invention.

At zero load and low partial load only the by-pass 13, 15 and 16 functions; at partial load and full load the entire system 13, 15 and 16 and 12, 19 and 20 functions. This is illustrated in the FIG. 5 which diagrammatically illustrates the course of things with regard to the cylinder pressure changes, fuel mass flow, air mass flow and valve movement as a function of the crank angle. On the horizontal axis the crank angle is illustrated, on the vertical axis the corresponding quantities of the above-mentioned are shown in an otherwise dimensionless scale. The absolute quantity of the values to be indicated depends on the dimensioning of the device (engine). Lines a and a' illustrate the valve movement, i.e. the valve opening of the exhaust and intake valves respectively; line b illustrates the pressure changes in the cylinder; line c illustrates the fuel injection timing; line d illustrates the air supply through the by-pass channel; the ignition timing is illustrated by means of an and the upper and lower dead centres are indicated by BDP and ODP. In other words, FIG. 5 diagrammatically illustrates the functioning of the regulator 22 and the control 14 of the valve 13 of the parallel inlet channel.

I claim:

1. A four-stroke internal combustion engine, comprising one or more pistons, a cylinder block having formed therein a like number of cylinders in which said pistons can move, a cylinder head, and like numbers of intake valves, spark plugs and fuel injectors;

said pistons approaching said head closely and having combustion chambers formed therein;

main air intake passages and parallel air intake passages being formed in said cylinder head and communicating at inlet ports with said cylinders, said ports being opened and closed by said intake valves;

said parallel intake passages being at least partially separated from the main intake passages and having outlet ends opening into said main intake passages upstream of said intake valves;

said fuel injectors being mounted in said main intake passage and said spark plugs being mounted in said cylinder head such that the spark gaps defined by said spark plugs are in said combustion chamber;

wherein said parallel intake passages are arranged such that air flowing out of said outlet ends of said parallel intake passages is directed essentially at the corresponding spark gaps, and said fuel injectors are arranged such that fuel flowing from said injectors is directed essentially at the head of the intake valve.

* * * * *